United States Patent [19]

Rice

[11] Patent Number: 4,619,617
[45] Date of Patent: Oct. 28, 1986

[54] TEACHING AID FOR CPR

[76] Inventor: Cecil L. Rice, 2541 Windjammer Drive, Mississauga, Ontario, Canada, L5L 1H7

[21] Appl. No.: 764,347
[22] Filed: Aug. 12, 1985
[51] Int. Cl.⁴ ............................................. G09B 23/30
[52] U.S. Cl. .................................................. 434/265
[58] Field of Search ...................... 434/265, 267, 275

[56] References Cited

U.S. PATENT DOCUMENTS

| 3,049,811 | 8/1962 | Ruben . |
| 3,199,225 | 8/1965 | Robertson . |
| 3,276,147 | 10/1966 | Padellford . |
| 3,994,075 | 11/1976 | Kohnke . |
| 4,001,950 | 1/1977 | Blumensaadt . |

FOREIGN PATENT DOCUMENTS 791741   3/1958   United Kingdom ................ 434/265

Primary Examiner—Harland S. Skogquist
Attorney, Agent, or Firm—Donald E. Hewson

[57] ABSTRACT

The invention distinguishes between two aspects of learning the technique of cardio-pulmonary resuscitation. One aspect is in learning what CPR feels like. The other is in learning the sequence of actions, times, rates, etc. It is the latter aspect that is more easily forgotten, and the invention provides a very inexpensive aid, which has the simplest possible mouth and chest simulators. The student can carry out a periodic repetition of the routine of motions on the aid. Refresher courses are then not needed so often, and the courses can concentrate on the "feel" aspects of CPR rather than the "routine" aspects. A simple and inexpensive teaching and practice aid for CPR is provided which has a stand on which a piece of foam material is mounted, and a generally self-supporting tube which has an upwardly facing open end. The other end of the tube is connected to a balloon. The structure and action of the device more or less replicates the physiology of a person in cardio-pulmonary arrest.

9 Claims, 2 Drawing Figures

TEACHING AID FOR CPR

FIELD OF THE INVENTION

This invention relates to a teaching practise aid by means of which a student may practice certain aspects of cardio-pulmonary resuscitation (CPR).

BACKGROUND OF THE INVENTION

CPR techniques are for use in reviving persons whose breathing and heartbeat have stopped. CPR must be done immediately, by whoever is at hand, if it is to be effective. There is no time to wait until medical practitioners arrive.

Persons who know this and are concerned about being prepared for emergencies therefore wish to learn how to do CPR. This is especially so if the person has, for example, a relative who is likely to suffer a cardio-pulmonary arrest.

The knowledge that the patient will die if the CPR is done badly induces panic. Only those actions which have been so thoroughly drilled and practiced that they are automatic can be relied on in the heat and stress of such a moment.

People recognize this, and accordingly, there are many courses on CPR, widely available to the public.

In CPR, the rescuer carries out a series of compressions of the patient's chest. These are for the purpose of squeezing the heart, firstly to stimulate the heart's pumping action, to keep the blood circulating; and secondly to induce the heart to resume its own pumping action. The rescuer also carries out mouth-to-mouth respiration, again for the dual purposes of keeping up a supply of air to the patient, and of inducing the patient's lungs to resume their own action.

In the CPR courses, the instructor helps the students with practising the necessary movements, either on real people or on dummies. A whole industry has arisen for supplying these dummies, the concern being in each case to make the dummy more and more like a real patient.

The following patents may be regarded as showing the state of the art of such dummies:

U.S. Pat. No. 3,049,811 (Ruben, Aug. 21, 1962)
U.S. Pat. No. 3,199,225 (Robertson, Aug. 10, 1965)
U.S. Pat. No. 3,276,147 (Padellford, Oct. 4, 1966)
U.S. Pat. No. 3,994,075 (Kohnke, Nov. 30, 1976)
U.S. Pat. No. 4,001,950 (Blumensaadt, Jan. 11, 1977)
G.B. Pat. No. 791,741 (Latham, Mar. 12, 1958)

It is recognized in the present invention that the student has two different kinds of skill to learn if he or she is to master CPR. The first kind of skill lies in becoming aware of what is feels like to breath air into someone else's lungs, or to massage someone else's heart, and in learning how hard to press and to blow.

In this first kind of skill should be included the skill that results in learning just exactly where to press a persons s chest, and with what part of the hand, to avoid the chance of injuring the patients ribs and organs.

The second kind of skill, for the purposes of the invention, lies in acquiring knowledge of how many times to repeat the chest compressions, and at what rate, and in learning when to interpose spells of respiration, and again at what rate.

One may characterize the first kind of skill as learning what it feels like to carry out CPR. One may characterize the second kind of skill as the purely mental skill of remembering sequences of actions, time intervals, and rates.

The present invention provides an aid for practising the second kind of skill. Since the aid of the invention is not intended to simulate what CPR feels like, the aid can be extremely low-priced. The dummies previously referred to are far too expensive for the ordinary CPR student to own. The dummies are made for sale to the course organizers, not to the students.

A student's skill in CPR tends to fall to a practically useless level unless the student attends periodic refresher courses, say once a year. It is recognized in the present invention, that the thing that the student tends to forget is the second, mental memory, kind of skill. The student does not tend to forget what CPR feels like. Therefore, a practise aid which only allows the mental, memory, aspects to be practiced, and not the physical aspects, is virtually just as useful to practice on as a regular highly expensive dummy.

Naturally, the student does have to attend a course, and to be started off on a dummy; but once the student has learned what CPR feels like, the student tends not to forget that aspect, or at least the student tends not to forget that aspect quite so quickly as he forgets the memory aspects.

It is an aim of the present invention to provide a teaching and practice aid which is of such a construction that is just sufficiently like a dummy as to make the CPR action meaningful when performed on it, but is otherwise as simple and inexpensive as possible.

It is a further aim of the present invention to provide a practise aid that is inexpensive enough to be purchased by any student, preferably when the student is attending a CPR course. The aid may then be taken home by the student for practice at the student's own convenience.

It is to be noted with respect to the apparatus of the patents mentioned above, that keeping the dummies clean and hygienic is a major problem for the course organizers. There is no hygiene problem with the aid of this invention, since each aid is intended for use by only one student.

There have been practice aids proposed previously, which have been less expensive regular dummies. In U.S. Pat. No. 3,152,404 (CHESHIRE, Oct. 13, 1964) for example, a device is shown which fits over the mouth and chest of a real person. This device is intended to avoid the problem that mouth-to-mouth resuscitation with a person who is breathing normally is quite unlike that with a person who has stopped breathing.

In U.S. Pat. No. 4,095,590 (HARRIGAN, June 20, 1978) the device is not intended to be like a dummy, but the device includes (expensive) means for indicating to the student when he is pressing too hard. It is a vital part of CPR training for the student to learn how hard to press, but that is a part of the training that is not intended to be covered by the aid of the present invention.

The aid itself, in this invention, includes a solid stand, which has a base for resting on the floor. A horizontal platform is positioned above the base on a pillar or pedestal, so that the platform is roughly at the height of a person's chest, when the person is lying face up on the floor.

A pad of foam material rests on the platform. Pressing down on such a pad feels quite markedly unlike pressing down on someone's chest; but that is of little importance, as has been explained.

Attached to the stand is a length of tubing, one end of which is open, and which is so positioned as to simulate the mouth of a person lying face up on the floor. The tubing is so made that it supports itself, once set, in the mouth-simulating position. At the other end of the tube is a simple balloon; and blowing into the tube is effective to inflate the balloon.

Again, blowing into the tube feels quite markedly different from blowing into a person's mouth; but again that is of little importance, as has been explained.

BRIEF DESCRIPTION OF THE DRAWINGS

Preferred embodiments of the invention will now be described with reference to the accompanying drawings, in which.

DESCRIPTION OF THE PREFERRED EMBODIMENTS

Figure 2:
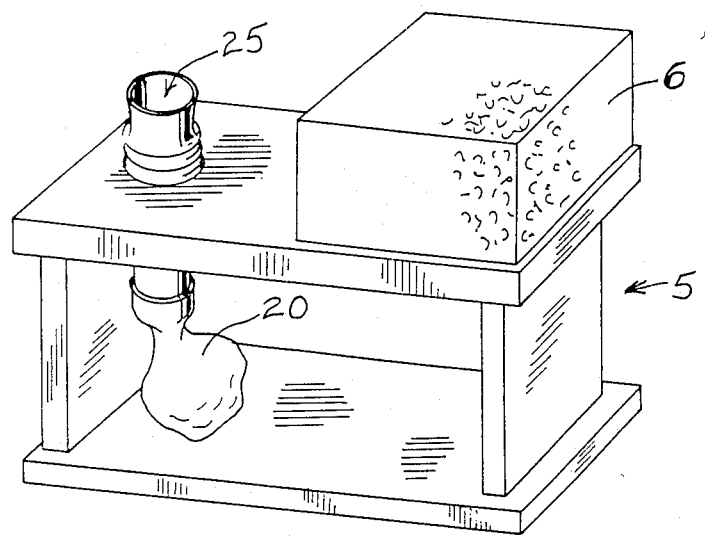
FIG. 2 is a similar view to a slightly smaller scale of a second embodiment of the present invention.
Figure 1:
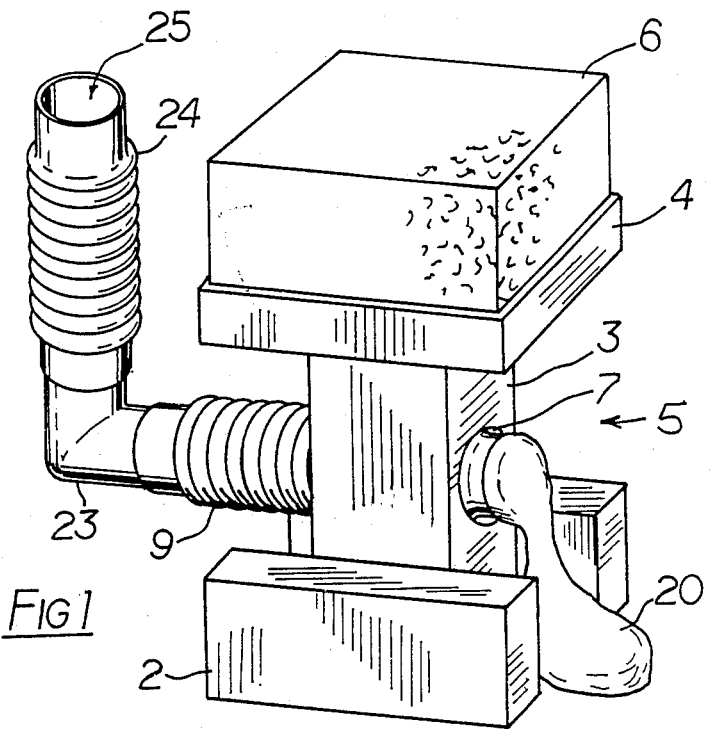
FIG. 1 is a perspective and somewhat diagrammatic view of a first embodiment of the invention.

The base 2, pillar or pedestal 3, and platform 4 comprise a stand 5. A block 6 of foam material such as foam rubber is glued onto the platform 4. The foam material is compressible through a distance of about 4 cm and constitutes a simulated chest.

A hole 7 is bored through the pillar 3, and a length of plastic tube 9 is inserted through the hole 7. On one end of the tube 9 is a balloon 20.

The other end of the tube 9 is coupled to a push-in elbow connector 23 which in turn is coupled to a second tube 24. The upper end 25 of the tube 24 is open, and constitutes a simulated mouth.

The tubes 9 and 24 are normally of the blow-moulded, convoluted kind. The plastic is thick enough that, with the dimensions of the tube as shown being in the 2 to 3 cm. diameter range, the tube itself is, in substance, rigid and self-supporting.

The fact that the tubing is convoluted is an advantage. The hole 7 in the pillar 3 is made simply by drilling, and it would be expensive to try to maintain tight tolerances on the diameter of the hole. However, a convoluted tube can be easily pushed in, yet be self-gripping in the hole on the crests of the convolutions, even though the hole may not be accurately made. A plain-walled tube, for example, could not be so easily held in the hole.

The pillar 3 is thick enough that several convolutions are gripped simultaneously in the hole 7, which gives a good, firm location for the tube 9.

In use, the student places the aid on the floor and kneels beside it. The student can then run through the CPR routine—the locating of the sternum, the check for clear air passages, the four quick respirations, the pause to listen for breathing, the fifteen timed compressions of the chest, etc., in the approved manner. Naturally, the student will have an instruction booklet for reference during practice.

The way the balloon 20 is placed on the end of the tube 9 is an advantage. One of the routines the student performs is to hold his fingers over the balloon end of the tube 9, to prevent the balloon 20 from inflating. When the student blows into the mouth 25, it feels quite different when the balloon is free to inflate from when the balloon cannot inflate. The difference alerts the student to go through the "blocked-air-passage" motions, which might or might not be required in a real emergency.

The aid is intended not only for use by the student at his or her own leisure, but is also intended for use during an actual CPR instruction session, to supplement the use of the more expensive dummies. In a course of, say, twenty students, there would typically be only one or perhaps two dummies available. The students can, with the invention, run through the motions on the aid before going to the dummy, which helps them to gain more from their period with the dummy and also means that their time on the course is not being wasted in waiting for their turn.

Thus, an aspect to be considered is that of packing and carrying the aid in quantities of about twenty at a time. The aid described above satisfies this aspect admirably. The stand 5 is made from rectangular blocks of wood, which, apart from being simple to make, are so dimensioned that the bases, pillars, and platforms of the respective stands fit neatly together, so that ten or twenty of the stands can fit into a box which the instructor can pick up and carry with ease. The tubes and balloons would be removed from the pillars for transport purposes, and carried in a separate bag.

If the aid were kept by the instructor only to supplement the use of dummies in the classroom, then a hygiene problem would arise. Therefore, the intention would normally be that the student takes home the aid at the end of the course.

Other dispositions of the component parts of the aid are possible, without departing from the idea of a very simple, basic, mouth and chest simulator. FIG. 2, shows an alternative. The diffences in construction are clear from the figure. Yet another configuration would have the tube 24 further removed from a hollow pedestal within which the balloon is located, and which may be supported by an arm because of its increased length. The longer distance between the foam material 6 and the mouth 25 is more replicative of the physiology of an adult human.

The present invention lies not so much in the particular manner of constructing the CPR teaching aid. Rather, this invention lies in recognizing that some aspects of CPR are much easier to forget than others, and in recognizing that a very simple, inexpensive CPR teaching and practice aid is all that is necessary for practising those aspects that are easily forgotten.

I claim:

1. A teaching and practise aid for teaching and rehearsing cardio-pulmonary resuscitation (CPR) techniques, comprising:

a stand, having a base for resting on a flat surface, and a horizontal platform rigidly located above said base, said base and platform forming an integral structure;

a pad of foam material resting directly on top of said platform, where the material of the pad is resiliently compressible as to the vertical thickness of the pad through a substantial distance upon being pressed downwards towards said platform, to simulate the chest of a patient;

and a length of tubing, which is attached at an attachment point to the stand;

where one end of the tubing is left open;

where the tubing is so positioned and dimensioned and of such material that, at least a portion of the length of said tubing is vertically directed and terminates at said open end, and is substantially self-supporting;

where said open end of said tubing is so located with respect to said pad that said open end simulates the mouth of a patient;

and having a stretchable and inflatable balloon, the neck of which is fitted over the end of said length of tubing remote from said open end; and where said tubing provides a direct passage from said open end to said balloon and has no other openings.

2. The CPR teaching and practise aid of claim 1 where said tubing is substantially cylindrical and is blow-moulded in thin plastic material, and where the tubing wall is convoluted.

3. The CPR teaching and practise aid of claim 2, where, at least at said attachment point, said base has a cylindrical hole formed therein; and where the crests of said convoluted tubing are a tight fit in said hole.

4. The CPR teaching and practise aid of claim 3, where said hole is long enough that more than two convolutions of said convoluted tubing are in contact with the inside wall of said hole, so as to provide a good and firm attachment of said tubing to said stand.

5. The CPR teaching and practise aid of claim 4, where said hole is formed horizontally through a pillar, and said tubing includes a right-angle bend.

6. The CPR teaching and practise aid of claim 5, where the end of the tubing to which the balloon is attached is accessible to the fingers of the user, and that end of the tubing may be blanked off by the fingers to prevent air passing to the balloon.

7. The CPR teaching and practise aid of claim 1, where said stand is constructed from simply-shaped pieces of wood.

8. The CPR teaching and practise aid of claim 7, where the pieces of wood are all rectangular.

9. The CPR teaching and practise aid of claim 1, where said stand is so constructed that several identical stands are stackable together, at least when the tubing is not present at said attachment point.

* * * * *